US010057767B2

(12) United States Patent
Yerrabommanahalli et al.

(10) Patent No.: US 10,057,767 B2
(45) Date of Patent: Aug. 21, 2018

(54) METHODS AND APPARATUS TO SUPPORT LOCATION SPECIFIC CONTROL OF ACCESS TO SERVICES THROUGH UNTRUSTED WIRELESS NETWORKS

(71) Applicant: Apple Inc., Cupertino, CA (US)

(72) Inventors: Vikram Bhaskara Yerrabommanahalli, Sunnyvale, CA (US); Ajoy K. Singh, Milpitas, CA (US); Krisztian Kiss, Hayward, CA (US); Rohan C. Malthankar, San Jose, CA (US); Thomas F. Pauly, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 14/975,535

(22) Filed: Dec. 18, 2015

(65) Prior Publication Data

US 2016/0183085 A1  Jun. 23, 2016

Related U.S. Application Data

(60) Provisional application No. 62/094,758, filed on Dec. 19, 2014.

(51) Int. Cl.
*H04L 29/06* (2006.01)
*H04W 12/04* (2009.01)
*H04W 64/00* (2009.01)
*H04W 12/06* (2009.01)
*H04W 12/08* (2009.01)

(52) U.S. Cl.
CPC ......... *H04W 12/04* (2013.01); *H04L 63/0428* (2013.01); *H04L 63/107* (2013.01); *H04L 65/1006* (2013.01); *H04L 65/1016* (2013.01); *H04W 12/06* (2013.01); *H04W 12/08* (2013.01); *H04W 64/00* (2013.01)

(58) Field of Classification Search
CPC .................................................. H04L 63/0428
USPC ......................................................... 713/153
See application file for complete search history.

(56) References Cited

U.S. PATENT DOCUMENTS 9,319,959 B2   4/2016  White et al.
9,380,610 B2   6/2016  Yerrabommanahalli et al.
(Continued)

FOREIGN PATENT DOCUMENTS

EP   2209330 A2   7/2010
EP   2887594 A1   6/2015

OTHER PUBLICATIONS

IKEv2 Phase 1 (IKE SA) and Phase 2 (Child SA) Message Exchanges (PDF file is attached).*
(Continued)

*Primary Examiner* — Hadi S Armouche
*Assistant Examiner* — Khalil Naghdali
(74) *Attorney, Agent, or Firm* — Dickinson Wright RLLP

(57) ABSTRACT

Apparatus and methods to support location specific control to allow and/or disallow access to services through untrusted wireless networks by a wireless communication device are disclosed. One or more network elements obtain a location of the wireless communication device and selectively allow and/or disallow access to one or more cellular network services and/or one or more access point names (APNs) based on the location of the wireless communication device when connecting through an untrusted wireless network.

20 Claims, 6 Drawing Sheets

(56) References Cited

U.S. PATENT DOCUMENTS

| | | | |
|---|---|---|---|
| 9,438,566 B2* | 9/2016 | Zhang | H04L 63/061 |
| 9,867,098 B2 | 1/2018 | Kwok et al. | |
| 2004/0105434 A1 | 6/2004 | Baw | |
| 2005/0059391 A1 | 3/2005 | Ikeda et al. | |
| 2005/0075109 A1 | 4/2005 | Neyret et al. | |
| 2008/0176582 A1* | 7/2008 | Ghai | H04W 4/02 |
| | | | 455/456.2 |
| 2011/0171926 A1* | 7/2011 | Faccin | H04W 48/18 |
| | | | 455/404.1 |
| 2011/0171940 A1 | 7/2011 | Dinur | |
| 2013/0065585 A1* | 3/2013 | Pelletier | H04W 4/02 |
| | | | 455/435.1 |
| 2013/0155948 A1* | 6/2013 | Pinheiro | H04W 4/005 |
| | | | 370/328 |
| 2014/0071970 A1* | 3/2014 | Velasco | H04W 4/02 |
| | | | 370/338 |
| 2014/0101726 A1* | 4/2014 | Gupta | H04N 21/2365 |
| | | | 726/4 |
| 2015/0350983 A1 | 12/2015 | Kwok et al. | |
| 2016/0029189 A1 | 1/2016 | Michael et al. | |
| 2016/0044064 A1 | 2/2016 | Pison et al. | |
| 2016/0163463 A1* | 6/2016 | Namikawa | H01G 4/33 |
| | | | 361/301.3 |
| 2017/0094512 A1 | 3/2017 | Kiss et al. | |

OTHER PUBLICATIONS

European Patent Application 16189983.6—Extended European Search Report dated Feb. 10, 2017.
3GPP TS 24.302 V13.3.0; "3rd Generation Partnership Project; 1-8, Technical Specification Group Core Network 10-15 and Terminals; Access to the 3GPP Evolved Packet Core (EPC) via non-3GPP access networks; Stage 3 (Release 13)", Sep. 25, 2015, 120 pages.

* cited by examiner

METHODS AND APPARATUS TO SUPPORT LOCATION SPECIFIC CONTROL OF ACCESS TO SERVICES THROUGH UNTRUSTED WIRELESS NETWORKS

CROSS-REFERENCE TO RELATED APPLICATIONS

This Application claims the benefit of U.S. Provisional Application No. 62/094,758, entitled "METHODS AND APPARATUS TO SUPPORT LOCATION SPECIFIC CONTROL OF ACCESS TO SERVICES THROUGH UNTRUSTED WIRELESS NETWORKS", filed Dec. 19, 2014, the content of which is incorporated by reference herein in its entirety for all purposes.

FIELD

The described embodiments generally relate to wireless communications, and more particularly, to methods and apparatus to support location specific control to allow and/or disallow access to services and/or to establish connections with network gateways through untrusted wireless networks by a wireless communication device.

BACKGROUND

Fourth generation (4G) cellular wireless networks employing newer radio access technology that implements one or more 3$^{rd}$ Generation Partnership Project (3GPP) Long Term Evolution (LTE) and LTE Advanced (LTE-A) standards are rapidly being developed and deployed by network operators worldwide. The newer cellular wireless networks provide a range of packet based services in parallel with legacy second generation (2G) and third generation (3G) wireless networks that can provide both circuit-switched voice services and packet-switched data services. The cellular wireless networks also overlap with multiple wireless local area network (WLAN) based networks that may provide additional localized high-speed packet data access for various services. Wireless communication devices can include capabilities to connect with different types of wireless networks, e.g., based on what wireless networks are available at a particular location, based on various capabilities of available wireless networks, based on capabilities of the wireless communication device, based on properties of particular services provided by one or more of the wireless networks, and/or based on service subscriptions with which the wireless communication device is associated. Wireless communication devices can include wireless radio circuitry that provides for communication via multiple radio frequency interfaces that can connect through different wireless networks. Wireless cellular network service providers are adding WLAN connectivity to provide access to cellular services through WLAN networks to provide access for cellular service subscribers that supplement access via cellular wireless networks. In some circumstances, access to particular cellular services by a subscriber using a wireless communication device may vary based on whether the wireless communication device is connected through an access network portion of a cellular wireless network, through a trusted non-cellular wireless network, or through an untrusted non-cellular wireless network. Each WLAN can provide a different level or different type of security than provided by a cellular wireless network. In addition, for regulatory or business reasons, a wireless service provider may seek to allow or deny access to one or more particular cellular services. As such, there exists a need for solutions that provide for managing control of access to cellular wireless network services based on a location of the wireless communication device when connecting through untrusted wireless networks.

SUMMARY

Apparatus and methods to support location specific control to allow and/or disallow access to services through untrusted wireless networks by a wireless communication device, such as user equipment (UE), are disclosed. Representative embodiments of methods and apparatuses to obtain a location of a wireless communication device and to selectively allow and/or disallow access to cellular network services based on the location of the wireless communication device when connecting through an untrusted wireless network are provided herein. Solutions provided herein may be used as part of and/or in conjunction with one or more 3GPP wireless communication protocols.

In some embodiments, a UE provides geographic location information directly or indirectly when (or after) establishing a secure tunnel connection to an evolved packet data gateway (ePDG) that provides an interface to a packet data network (PDN) gateway for access to one or more services. The UE can establish a secure tunnel to each of several different access point names (APNs) that each offer a set of services to which the UE can seek to gain access. For each APN, the ePDG can determine whether to allow or disallow establishment of a secure tunnel to the APN for the UE based on the geographic location of the UE. The ePDG can also allow the establishment of a secure tunnel to an APN, after which the UE can seek to register for one or more services provided through the APN, e.g., Session Initiation Protocol (SIP) registration for IMS services. In some embodiments, a SIP registration server can selectively allow or disallow services for the UE based on a determined geographic location of the UE. The SIP registration server can permit registration of the UE for a set of requested services and then subsequently perform deregistration for a subset of services that are disallowed for the UE when operating from its current geographic location. The geographic location information can be at a coarse scale, e.g., based on a country or region or access via a particular network, and/or can be at a fine scale, e.g., based on Global Positioning System (GPS) coordinates or other specific latitude and longitude coordinates for the UE. The geographic location information for the UE can be updated by the UE and/or determined by the ePDG after establishing a secure tunnel connection and access to services and/or connections can be changed as required to correspond to the updated geographic location information. Geographic location information can be determined by the ePDG based on information provided by the UE and/or based on information obtained from other network elements, such as based on cellular registration information for the UE obtained from the cellular network infrastructure.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
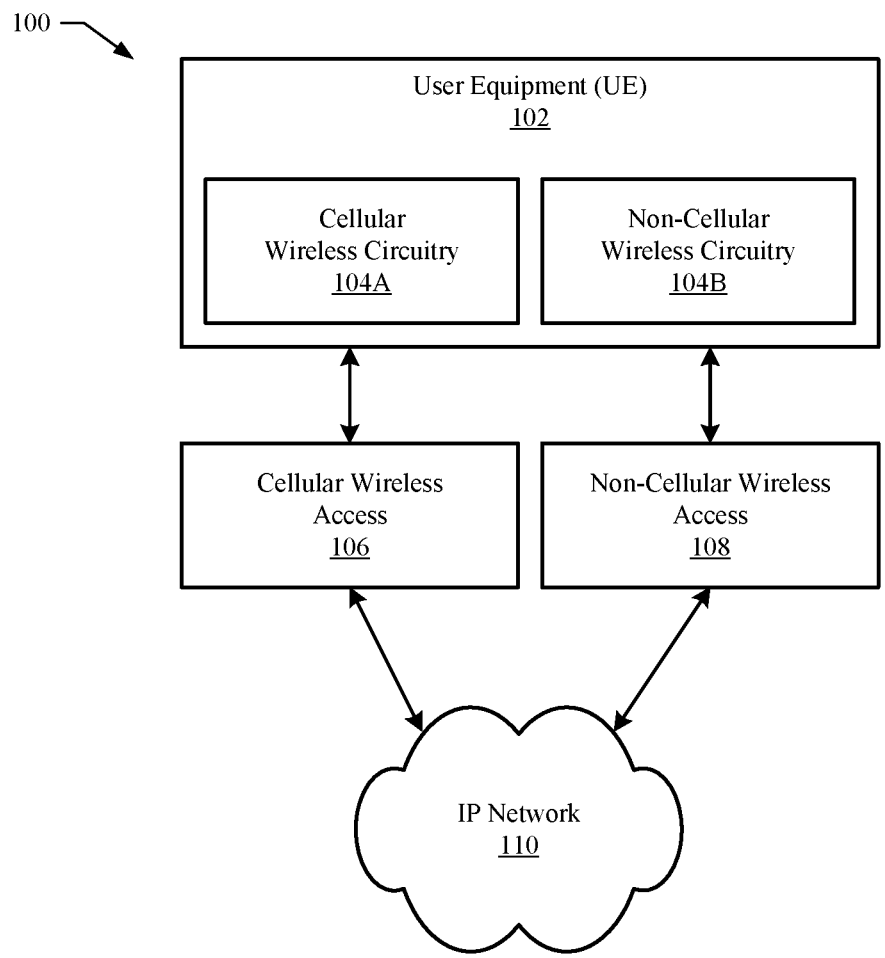
FIG. 1 illustrates an exemplary wireless communication device configurable to connect individually or in parallel through a cellular wireless access network and a non-cellular wireless access network, in accordance with some embodiments.

Representative examples for controlling access to one or more access point names (APNs) and/or services provided through the APNs for a wireless communication device based on a geographic location of the wireless communication device are provided herein. These examples are provided to add context to, and to aid in the understanding of, the subject matter of this disclosure. It should be apparent that the present disclosure can be practiced with or without some of the specific details described herein. Further, various modifications and/or alterations can be made to the subject matter described herein, and illustrated in the corresponding figures, to achieve similar advantages and results, without departing from the spirit and scope of the disclosure.

Wireless service providers are deploying WLANs in parallel with cellular wireless networks to expand options for access to evolved packet core (EPC) services, such as Internet Protocol Multimedia Subsystem (IMS) based services including voice over IP (VOIP), and Application type services including visual voice mail (VVM), short message service (SMS), and multimedia message service (MMS). Access to these EPC services through an untrusted WLAN network can be realized using an S2b reference point interface. Wireless communication devices can support packet data network (PDN) connections through multiple wireless interfaces, such as via a cellular wireless interface and via a WLAN interface, both individually and in parallel. Wireless service providers can seek to control access to services depending upon a location of the wireless communication device, depending on whether the wireless communication device is on a home network or on a roaming network, depending on the type of connection through which the wireless communication device connects including security establishment, etc. In order to ensure secure communication, connections by a wireless communication device that traverse an S2b reference point can use an Internet Key Exchange Version 2 (IKEv2) protocol between the wireless communication device and an evolved packet data gateway (ePDG). The wireless communication device can establish a secure tunnel for each access point name (APN) to which a connection is required to access services offered by the APN. For example, an IMS tunnel can be used to provide VoIP services at one APN, while a separate Application tunnel can be used to provide MIMS and/or other EPC based services to the wireless communication device. Parallel secure tunnels can provide access to different services, and wireless service providers can seek to control to which services a wireless communication device can have access based on a location of the wireless communication device. Access to services can be controlled by determining whether to establish a connection with an APN and/or by determining which services are accessible through an APN.

Wireless access through untrusted WLAN connections using an S2b reference point interface via the Internet to wireless service provider based services, e.g., evolved packet core (EPC) services, can be provided to a wireless communication device when operating anywhere in the world. Based on local regulatory requirements and/or for various business reasons, a wireless service provider can seek to allow and/or disallow access to services selectively based on a location of the wireless communication device. For example, a wireless service provider can allow access to one set of services, such as messaging services, for a wireless communication device, while disallowing access to another set of services, such as VoIP services, when the wireless communication device is roaming. Thus, there exists a need to control access to specific wireless services from a given geographic location of the wireless communication device. In some embodiments, an IKEv2 protocol can be augmented to provide for selective access (allowing and/or disallowing access) to particular services, such as EPC services provided by a wireless service provider based on one or more APNs. When establishing an IKEv2 tunnel, a geographic location of the wireless communication device can be obtained, e.g., based on direct or indirect communication from the wireless communication device or based on a determination by one or more network elements in conjunction with the wireless communication device. Based on the obtained geographic location of the wireless communication device, access to particular APNs and/or to particular services offered by one or more APNs can be selectively controlled.

An ePDG to which the wireless communication device seeks to establish a secure tunnel can notify the wireless communication device whether a set (or a subset) of services offered by a particular APN is allowed or disallowed from the specific geographic location of the wireless communication device. In some embodiments, the wireless communication device can be disallowed from establishing and/or maintaining a connection to a particular APN when seeking to access services from that particular APN, while operating in a specific geographic location. In some embodiments, the wireless communication device can establish a connection to a particular APN but can access only a subset of services available at that APN, where access to the subset of services is based at least in part on the geographic location from which the wireless communication device operates. In some embodiments, a network element, such as an ePDG, can notify the wireless communication device during establishment of a secure tunnel, such as an IPSec tunnel, that access to a particular APN (or a set of particular APNs) is not allowed from the current location of the wireless communication device. In some embodiments, the notification to the wireless communication device is provided after establishment of the secure tunnel. In some embodiments, access to a subset of services of an APN is provided through the secure tunnel when the wireless communication device connects through an untrusted wireless network. In some embodiments, access to services by a wireless communication device can be based on a combination of one or more of: a type of connection, a type of wireless access network through which a connection is established or being established, a type of tunnel established or being established, a current or estimated geographic location of the wireless communication device, or a service policy associated with the wireless communication device.

To identify the current or estimated geographic location of the wireless communication device, the ePDG can use location information provided by the wireless communication device, such as in one or more IKEv2 configuration attributes included in one or more messages, and/or using an Internet Protocol (IP) address of the wireless communication device from which a connection attempt is made. In some embodiments, the wireless communication device can communicate, via IKEv2 signaling, wireless network information, such as a public land mobile network (PLMN) identifier (ID), a mobile country code (MCC), and/or a mobile network code (MNC) based on available system information block (SIB) messages received by the wireless communication device from a parallel cellular wireless network. In some embodiments, the wireless communication device can communicate, via IKEv2 signaling, a last known cell ID, e.g., in a format similar to the P-Access-Network-Info header field of the SIP protocol defined in IETF RFC 7315. In some embodiments, the wireless service provider can use a domain name system (DNS) based discovery of a nearest ePDG or packet gateway (PGW) to determine an approximate location of the wireless communication device by accessing information about the nearest ePDG/PGW. In some embodiments, information about the nearest ePDG/PGW can be used only when the UE 102 operates within a home network geographic region and not used when the UE 102 operates within a roaming network geographic region. In some embodiments, the wireless communication device can refrain from seeking to establish a new connection to a particular APN or to access particular services while continuing to operate from the same location.

When multiple services are supported over a single APN, e.g., VoIP and SMS via an IMS APN, individual services can be selectively allowed or disallowed in place of and/or in conjunction with allowing or disallowing establishment of a secure tunnel to the APN via the ePDG. In some embodiments, the ePDG allows a wireless communication device to establish a secure IKEv2 tunnel for a specific APN, and other network elements, such as a serving call session control function (S-CSCF) determines whether to accept or reject an IMS registration for different services by the wireless communication device based on the wireless communication device's current/estimated geographic location. In some embodiments, all, some or none of the services available via the APN may be allowed and/or disallowed based on the geographic location of the wireless communication device. In some embodiments, the wireless communication device can initiate registration of one or more services, and the S-CSCF (or another combination of applicable controlling network elements) can determine whether each of the one or more services is allowed or disallowed for the wireless communication device operating from its current geographic location. The S-CSCF can first accept registration of the wireless communication device and then initiate a deregistration procedure to remove one or more disallowed services from the registration status record of the wireless communication device.

As described in further detail herein, solutions to support selective access to services for a specific APN, to which a wireless communication device seeks to connect, can be based on a current/estimated geographic location of the wireless communication device. As controlled by one or more network elements, such as an ePDG and/or IMS servers, access to a wireless service provider's EPC services can be limited based on a geographic location of the wireless communication device by selective allowance or disallowance of particular services by the IMS servers and/or by allowing or disallowing establishment of an IKEv2 tunnel with the ePDG.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms wireless communication device, wireless device, mobile device, mobile station, and user equipment (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) LTE and LTE Advanced (LTE-A) or similar later generation cellular wireless access communication capabilities as well as wireless local area network communication capabilities. In various embodiments, these capabilities may allow a respective UE to communicate and manage simultaneous IP flows via multiple wireless access networks.

Additionally, it should be understood that the UEs described herein may be configured as multi-mode wireless communication devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, and LTE-A standards or 3GPP2's CDMA2000 (1×RTT, 2×EV-DO, HRPD, eHRPD) standards. Multi-mode UEs can also support communication using wireless local area networking protocols, e.g., an Institute of Electrical and Electronics Engineers (IEEE) 802.11 (Wi-Fi), an IEEE 802.16 (Wi-MAX), and wireless personal area networking protocols, e.g., Bluetooth®. Multiple wireless communication protocols can provide complementary functions and/or different services for a multi-mode UE.

IKEv2 is an Internet Engineering Task Force (IETF) specified protocol described in the Request For Comments (RFC) 5996 and RFC 7296 documents, which are incorporated by reference herein in their entirety for all purposes. The IKEv2 signaling protocol can be used to establish a security association between the UE and a network element, e.g., an evolved packet data gateway (ePDG), such as when establishing an Internet Protocol Security (IPsec) Encapsulated Security Protocol (ESP) tunnel between the UE and the network element to provide for secure communication between the UE and the network, such as based on mutual authentication and cryptographic key negotiation. The IKEv2 signaling protocol can also be used to exchange additional information between the UE and the ePDG using an extensibility mechanism, e.g., using information messages and information exchange sequences as defined, at least in part, in Sections 1.4 and 1.5 of RFC 5996.

FIG. 1 illustrates an exemplary wireless system 100 that includes user equipment (UE) 102, which includes wireless circuitry that can be configured to connect the UE 102 with one or more wireless networks individually or in parallel. The UE 102 includes both cellular wireless circuitry 104A, which can be configured to connect the UE 102 through a cellular wireless access 106 to various services provided via an Internet Protocol (IP) packet based network 110, and non-cellular wireless circuitry 104B, which can be configured to connect the UE 102 through a non-cellular wireless access 108 to the same IP network 110. An LTE evolved packet system (EPS) provides services to the UE 102, both real-time services, such as voice/video conference calls, and data communication services, such as web browsing and email access, using an IP protocol. The LTE EPS, as introduced in the Release 8 3GPP wireless communication standard, defines an architecture in which heterogeneous wireless access systems, such as a combination of cellular wireless access 106 and non-cellular wireless access 108, can be used by the UE 102 to connect to a common core network (not shown). The UE 102 can establish a packet data network (PDN) connection through one wireless access and subsequently add or change to a second wireless access. The UE 102 can communicate over multiple wireless accesses, such as the cellular wireless access 106 and the non-cellular wireless access 108, individually or simultaneously using the same PDN connection. In some circumstances, a wireless service provider can seek to allow access to particular services, such as a set of one or more EPC based services, through one type of wireless access, e.g., the cellular wireless access 106, and not through another type of wireless access, e.g., the non-cellular wireless access 108, at least based on a location of the UE 102. Thus, the UE 102 can access through an untrusted WLAN via an S2b interface IPSec tunnel one or more services when operating in some geographic locations but not when operating in other geographic locations.

The cellular wireless circuitry 104A and the non-cellular wireless circuitry 104B provide for wireless radio frequency (RF) connections between the UE 102 and parallel wireless networks that interconnect with the IP network 110 via the cellular wireless access 106 and the non-cellular wireless access 108 respectively. In some embodiments, the wireless circuitry 104A/B includes one or more baseband processor(s), and a set of RF analog front-end circuitry. In some embodiments, the wireless circuitry 104A/B and/or a portion thereof can include or be referred to as one or more wireless transmitter(s)/receiver(s) or transceiver(s) or radio(s). The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 104A/B can include components of RF analog front-end circuitry, e.g. a set of one or more antennas, which can be interconnected with additional supporting RF circuitry that can include filters and other analog components that can be configured for transmission and/or reception of analog signals via one or more corresponding antennas to one or more wireless access networks and/or wireless access equipment included therein.

Figure 2:
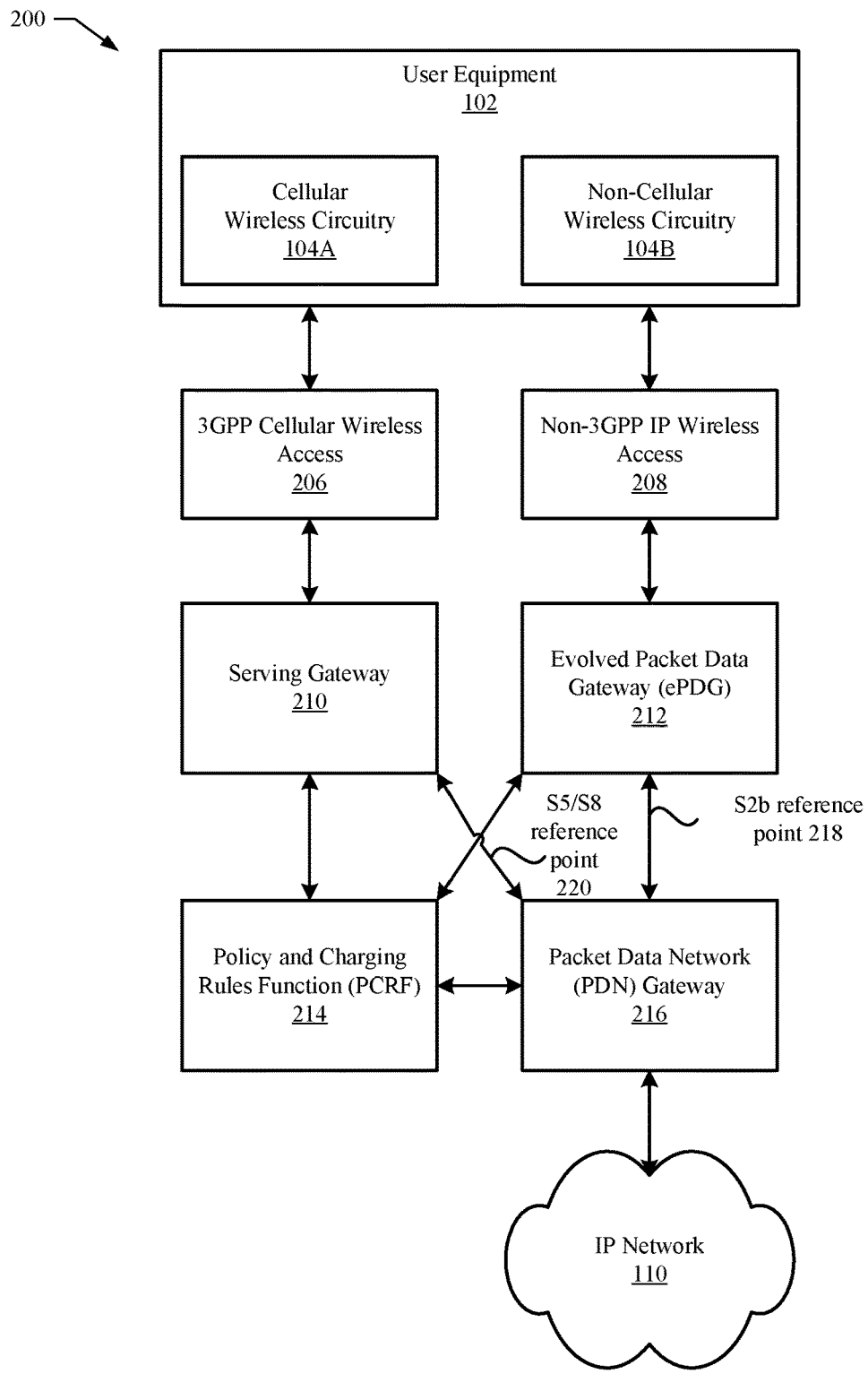
FIG. 2 illustrates example components of wireless access networks and a core network, in accordance with some embodiments.

FIG. 2 illustrates an exemplary wireless system 200 that includes the UE 102 communicatively coupled to the IP network 110 through a 3GPP cellular wireless access 206 and/or through a non-3GPP IP-based wireless access 208. In some embodiments, the 3GPP cellular wireless access 206 includes an evolved universal terrestrial access network (E-UTRAN) or other network elements of an LTE/LTE-A wireless network. In some embodiments, the non-3GPP IP wireless access 208 includes a wireless local area network (WLAN) or portions thereof, e.g., a wireless access point, and thus the non-3GPP IP wireless access 208 can also be referred to as a WLAN access. In some embodiments, the WLAN access can also be referred to as a Wi-Fi access to correspond to a WLAN that operates in accordance with a Wi-Fi wireless communication protocol. The UE 102 can be configured to connect individually and/or simultaneously to a given packet data network (PDN) through the 3GPP cellular wireless access 206 and the non-3GPP IP-based wireless access 208. The UE 102 can also be configured to add an IP flow to, delete an IP flow from, and/or move an IP flow between one or the other of the parallel wireless accesses, e.g., the 3GPP cellular wireless access 206 and the non-3GPP IP-based wireless access 208, for a PDN connection. The 3GPP cellular wireless access 206 connects to a serving gateway (GW), which connects to a PDN gateway 216 through an S5 reference point 220 or an S8 reference point 220 for roaming users. The PDN gateway 216 provides a connection to the IP network 110 through which a variety of services can be accessed. The non-3GPP IP wireless access 208 connects to an evolved packet data gateway (ePDG) 212, which connects to the PDN gateway 216 through an S2b reference point 218. Each of the serving gateway 210, the ePDG 212, and the PDN gateway 216 are also connected to a policy and charging rules function (PCRF) 214.

The 3GPP S2b reference point 218 between the ePDG 212 and the PDN gateway 216 provides a mechanism to allow the UE 102, when attached via an untrusted non-3GPP IP wireless access network (e.g., non-3GPP IP wireless access 208), to connect securely via a 3GPP evolved packet system (EPS) network to the IP network 110 and to access services via the secure connection. The UE 102 can establish a secure connection, e.g., an Encapsulating Security Payload (ESP) tunnel based on an IP Security (IPsec) protocol, using an IKEv2 protocol signaling exchange between the UE 102 and the ePDG 212, which in turn can establish a secure tunnel, e.g., a Proxy Mobile IPv6 (PMIP) or a GPRS Tunneling Protocol (GTP) tunnel, to the PDN gateway 216 when a session for the UE 102 is anchored.

Support for Selective Location Specific Service Access

In some embodiments, for the non-3GPP IP wireless access 308, e.g., such as a WLAN access, when establishing a new connection via the S2b reference point 218, the UE 102 and/or the ePDG 212 can determine geographic location information for the UE 102 and determine whether access to certain access point names (APNs) are allowed or disallowed based on the geographic location information for the UE 102. Communication of geographic location information and/or notification of allowance or disallowance of access to APNs (and/or to services provided through APNs) can be accomplished at least in part using IKEv2 message exchanges. In some embodiments, the UE 102 and the ePDG 212 can exchange information, including estimated and/or actual geographic location information, while establishing a secure tunnel between the UE 102 and the ePDG 212. In some embodiments, the estimated and/or actual geographic location information can be provided by the UE 102 to the ePDG 212 after establishing a secure tunnel with the ePDG 212. In some embodiments, access to an APN can be allowed or disallowed by determining whether to establish (or complete establishment of) a secure tunnel to an APN. As each secure tunnel can be associated with a specific APN, the ePDG 212 in conjunction with information provided by the UE 102 (and/or determined for the UE 102) can allow or disallow a corresponding secure tunnel for each APN. In some embodiments, particular APNs can be allowed when accessed through an S2b interface from some geographic locations and not through other geographic locations. In addition, the UE 102, in some embodiments, can access an APN while at a geographic location through a 3GPP cellular wireless access 206 while in a particular location but not through a non-3GPP IP wireless access 208 while operating in the same particular location. In some embodiments, a secure tunnel for a particular APN can be established between the UE 102 and the ePDG 212 after which geographic location information for the UE 102 can be provided by the UE 102 and/or determined by the ePDG 212, and based on the geographic location information for the UE 102, the ePDG 212 can determine whether to maintain or tear down the secure tunnel for the particular APN. In some embodiments, the ePDG 212 can determine that geographic location information for the UE 102 indicates that the UE 102 has changed its geographic location and can disestablish a secure tunnel with a particular APN based on the updated geographic location of the UE 102.

The UE 102 and the ePDG 212 can be considered as IKEv2 peers that exchange information during the establishment of a secure tunnel, e.g., during an authorization and authentication procedure, as part of a configuration payload exchange and/or through one or more notify messages using one or more IKEv2 attributes. In some embodiments, the IKEv2 attributes used can be formatted in accordance with attribute formats as defined in the IETF RFC 5996 and/or IETF RFC 7296, e.g., as shown in one or more of Sections 1.4, 1.5, and 3.15. IKEv2 attributes that can be used for communication between the UE 102 and the ePDG 212 as described herein, and may be defined in one or more 3GPP specifications and/or registered for use with the Internet Assigned Numbers Authority (IANA).

Selective, location-specific, allowance and/or disallowance of the establishment and/or maintenance of secure tunnels to particular APNs, and/or access to particular services offered by particular APNs, such as 3GPP EPC based services, when the UE 102 connects via an untrusted WLAN (e.g., Wi-Fi) network through an S2b interface can require information about the geographic location of the UE 102. Today, when wireless communication devices connect through a WLAN access network, a cellular wireless network can be unable to determine the geographic location of the wireless communication device. As described further herein, the cellular wireless network can determine a geographic location (whether actual or estimated) based on information that can be provided by the UE 102 and/or based on information that can be obtained from various network elements. The cellular wireless network can also provide information about the geographic location of the UE 102 to (or obtain information from) an IMS portion of a wireless network that manages and/or provides various IMS services. In some embodiments, the UE 102 indicates its geographic location directly or indirectly through information communicated when establishing a secure tunnel with the ePDG 212 and/or following establishment of the secure tunnel with the ePDG 212. Network elements, including but not limited to the ePDG 212, can use the geographic location information provided and/or obtained for the UE 102 to determine connectivity, e.g., whether to establish and/or maintain a secure tunnel to an APN, and/or control access to a set of services, e.g., whether to permit registration for one or more services provided via the APN. When the UE 102 connects through a cellular wireless network, the geographic location of the UE 102 can be determined based at least in part on information about a base station to which the UE 102 connects (and/or is associated). As wireless service providers add WLAN access networks to supplement and/or offload cellular wireless access networks, the wireless service provide can seek to offer access to core network services, such as IMS, VVM, MMS, SMS, etc. As different APNs can be used for different services, the wireless service provider can seek to control access to a particular APN and/or to particular services provided by an APN to the UE 102 based on its geographic location and/or based on the type of wireless connection through which the UE 102 seeks to access the services. For example, the wireless service provider can seek to allow access to SMS/MMS while disallowing VoIP services when the UE 102 operates in a particular geographic location and connects through an untrusted non-3GPP IP wireless access 208. In the same geographic location, the wireless service provider can allow access to the disallowed services when the UE 102 connects through the 3GPP cellular wireless access 206.

The UE 102 can provide to the ePDG 212 (and also to other network elements) geographic location information for the UE 102 based on information that the UE 102 can obtain. For example, the UE 102 can scan for cells and provide MCC and/or MNC information obtained from SIB messages broadcast by the cells. Furthermore, the UE 102 can provide latitude and longitude information derived from a global positioning system (GPS) receiver and/or from WLAN access point (AP) crowd-sourced location data. The UE 102 can provide geographic information at a coarse level of specificity (e.g., a country, region, or mobile network) and/or a fine level of specificity (e.g., GPS coordinates). This geographic location information can be provided when establishing a secure tunnel and/or after establishing a secure tunnel, and the ePDG 212 and/or other network elements can use the geographic location information to determine whether to allow or disallow a particular connection (e.g., to a particular APN) or access to a particular service or set of services provided by an APN. Based on the geographic location information, the ePDG 212 can limit connections and/or access to services and/or drop/modify existing connections and/or access to services for the UE 102. In place of, or in addition to, the geographic location information provided by the UE 102, the ePDG 212 can determine geographic location information, e.g., by using a public IP address assigned to the UE 102. (The public IP address may prove misleading in some cases, e.g., when access is achieved through a virtual private network, and as such, the ePDG 212 may choose to only use information that is likely to be accurate.)

In some embodiments, the ePDG 212 can provide a notification message to the UE 102 during and/or after establishing the secure tunnel to indicate whether access to a service (or set of services) provided by an APN and/or establishment of a connection to an APN is allowed or disallowed. In some embodiments, the notification message can indicate that access to a particular APN is not allowed at the current geographic location of the UE 102. In some embodiments, the notification message can indicate that a particular service is not allowed at the current geographic location of the UE 102. In some embodiments, the notification message can indicate that a particular set of services is not allowed at the current geographic location of the UE 102. In some embodiments, the notification message can indicate that a particular set of services offered by a particular APN is not allowed at the current geographic location of the UE 102. The notification messages can also, in some embodiments, provide for indicating that access at the current geographic location is not allowed through a non-cellular, untrusted, WLAN, and/or Wi-Fi connection. In some embodiments, the notification messages can indicate an alternative connection may be available, e.g., through a cellular, trusted, or other specific form of connection other than the UE 102 used to seek to establish a connection and/or access particular services that are not allowed. When control of access to services also corresponds to particular APNs, e.g., access to an IMS APN for a VoIP service versus access to VVM or MMS through an Application APN, the wireless service provider can allow or disallow establishing a connection to the APN (and thereby control access to any services offered by that APN). When the wireless service provider seeks to allow access to some services but not others offered by a particular APN, the UE 102 can be allowed to establish a secure tunnel to the APN, and another mechanism, such as allowing or not allowing registration (or forcing a deregistration after initially allowing a registration) for particular services provided by the APN. In some embodiments, the UE 102 can support UE-based or network-based IP flow mobility (IFOM) and access to services can be allowed or disallowed for particular flows, e.g., allowing access for a flow through the 3GPP cellular wireless access 206, while disallowing access for a parallel flow through the non-3GPP IP wireless access 208. In some embodiments, access to services provided by an APN and/or secure tunnels to an APN can change when the geographic location of the UE 102 changes and/or when an access type changes, e.g., when adding and/or switching between a cellular, trusted access, such as the 3GPP cellular wireless access 206, and a non-cellular, untrusted access, such as the non-cellular 3GPP IP wireless access 208.

IKEv2 Messages

Figure 3:
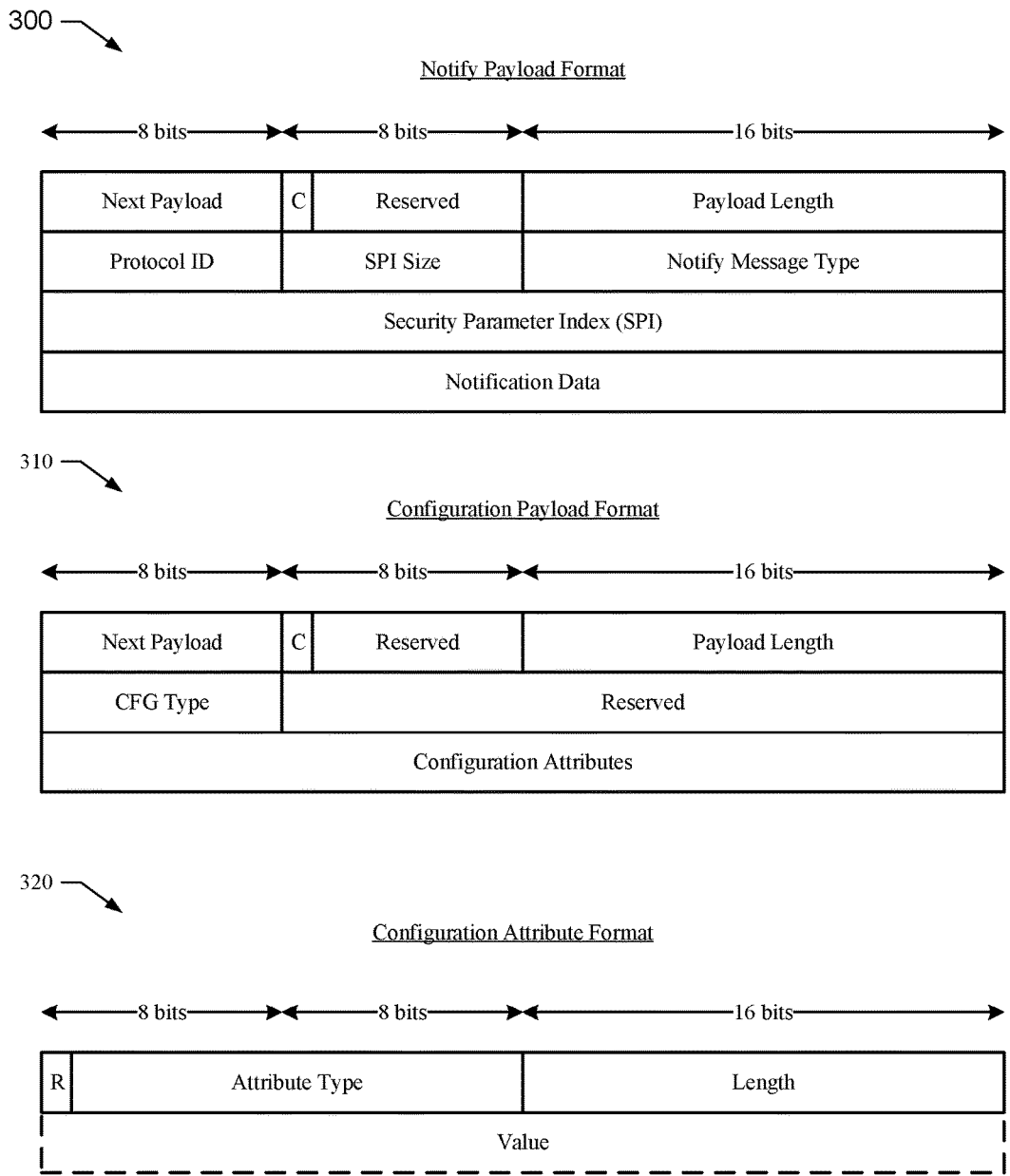
FIG. 3 illustrates a set of representative exemplary formats for messages that can be exchanged between a wireless communication device and a network element, in accordance with some embodiments.

IKEv2 messages can be exchanged between IKEv2 peers (e.g., the UE 102 and the ePDG 212) as part of one or more exchanges performed during and/or after establishment of a secure tunnel. The messages can be formatted in accordance with formats as defined in Sections of RFC 5996 and/or IETF RFC 7296. FIG. 3 illustrates a representative exemplary notify payload format 300, in accordance with some embodiments. The notify payload can be used to communicate notification data between IKEv2 peers. In some embodiments, the notify payload can include a notify message type that indicates a particular error, e.g., using a pre-determined value for the Notify Message Type field to indicate that access is not allowed from a current location of the UE 102. In some embodiments, multiple Notify Message Type field values can be used to indicate different levels of access, e.g., access to an APN can be denied, or access to a particular set of services from an APN can be denied. In a representative embodiment, an APN_ACCESS_NOT_ALLOWED_FROM_CURRENT_LOCATION notification can be provided when the UE 102 initiates a connection setup from a geographic location at which a wireless service provider does not allow one or more services offered over a specific APN. In some embodiments, the ePDG 212 responds to an IKE_SA_INIT request from the UE 102 with an IKE_SA_INIT response that includes the notify payload including an error message that indicates that APN access and/or service access is not allowed.

FIG. 3 also illustrates a representative configuration payload format 310 that can be used to communicate information between IKEv2 peers, such as the UE 102 and the ePDG 212, as part of one or more exchanges during and/or after establishment of a secure tunnel. In some embodiments, during establishment of the tunnel and/or after establishment of the tunnel, the UE 102 can provide geographic location information directly and/or indirectly, as described hereinabove, to the ePDG 212 as part of the configuration attributes field in the configuration payload format 310. In some embodiments, the configuration attribute field format 320 can be also as shown in FIG. 3, using a type length value (TLV) structure. In some embodiments, the UE 102 communicates a PLMN ID, an MCC value, an MNC value, GPS coordinates, and/or latitude and longitude values to the ePDG 212 using IKEv2 configuration attributes. In some embodiments, IKEv2 signaling messages provided by the UE 102 to the ePDG 212 can supplement information otherwise obtained to determine a location of the UE 102, e.g., to confirm whether the UE 102 operates in a geographic region for which access to one or more APNs and/or to particular services provided by one or more APNs is allowed and/or disallowed. In some embodiments, the UE 102 communicates a last known cell ID using IKEv2 signaling messages to the ePDG 212. The cellular wireless network can use the last known cell ID to determine an appropriate packet gateway (PGW) to use for routing purposes. The PGW can provide its own geographic information (or the cellular wireless network may already know its location) in order to further determine the geographic location of the UE 102. In some embodiments, the ePDG 212 can determine the geographic location of the UE 102 by obtaining cellular registration and/or roaming information for the UE 102. In some embodiments, the ePDG 212 can query wireless cellular network infrastructure elements, such as a home subscriber server (HSS) or authentication, authorization, and account (AAA) server to determine a geographic location for the UE 102 when the UE 102 is registered with the cellular network. The HSS and/or AAA server can maintain real-time updated information, such as geographic location information or other information from which geographic information can be determined, for a registered UE 102. In some embodiments, the ePDG 212 can retrieve geographic location information for the UE 102 from a serving GPRS support node (SGSN) and/or a mobility management entity (MME) through the HSS and/or AAA servers. As described in one or more 3GPP technical specifications, such as Technical Specification (TS) 29.272 and TS 29.273, which are both incorporated by reference herein for all purposes, an Access-Network-Info attribute value pair (AVP) for a Diameter can include a Location-Information AVP, e.g., as defined in IETF RFC 5580, as well as an Operator-Name AVP (e.g., an MCC/MNC pair) for an SWx reference point (e.g., an HSS/AAA server). In some embodiments, the format for the Location-Information AVP can be re-used to provide geographic location information from an HSS server to the ePDG 212 via the AAA server. In some embodiments, the ePDG 212 can request location information from the HSS, and in response, the HSS can request location information from the MME or the SGSN, e.g., as described in TS 29.272 section 5.2.2.1. In some embodiments, the ePDG 212 can use a domain name server (DNS) based ePDG/PGW discovery mechanism, such as a DNS look up of a fully qualified domain name (FQDN) to determine a nearest ePDG for the UE 102. As described elsewhere herein, the UE 102 can receive a notification about allowance and/or disallowance of access to an APN and/or to services for a particular geographic location, as communicated in a notify message, and can forgo attempting to establish a connection to one or more particular APNs or access particular services for one or more APNs that are disallowed from the same geographic location. In some embodiments, the notification from the ePDG 212 can be included as part of an IKE_SA_INIT (Security Association Initialization) response to the UE 102, where the notification can specify that APN and/or service access is not allowed from the current location of the UE 102. In some embodiments, additional reasons or information for the UE 102 can be provided in the notification message. The Notify Message Type field of the Notify Payload Format 300 can be a value within a range from zero to 16383 and can be determined as part of a table of IKEv2 parameters established and maintained by the IANA.

Figure 4:
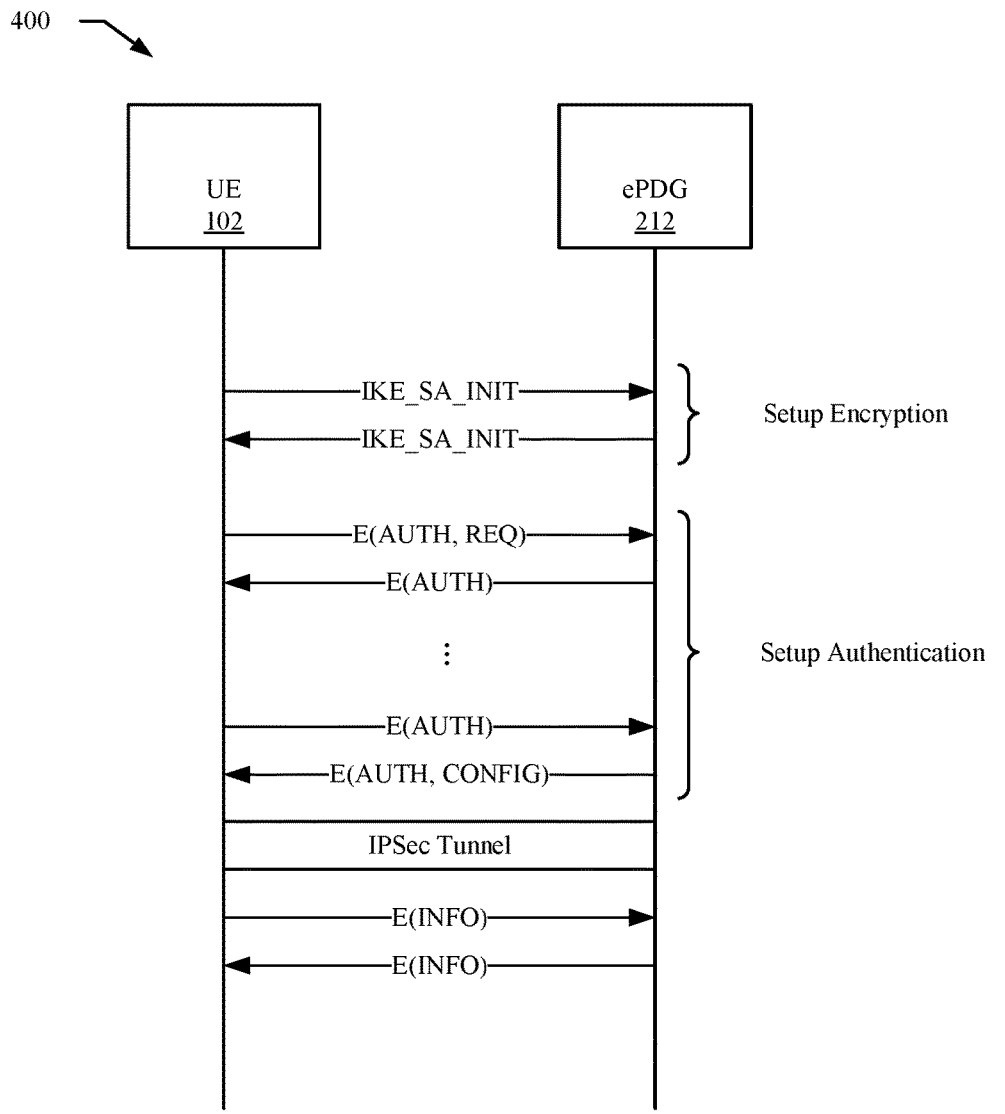
FIG. 4 illustrates a flow chart for an example message exchange to establish a secure tunnel between a wireless communication device and a network element, in accordance with some embodiments.

FIG. 4 illustrates a flow chart 400 of an exemplary set of message exchanges between the UE 102 and the ePDG 212. As shown, to establish an IPSec tunnel, for secure communication between the UE 102 and the ePDG 212, an initial exchange of IKE_SA_INIT request/response messages can be used to setup encryption followed by a second exchange of encrypted messages to setup authentication between the UE 102 and the ePDG 212. The ePDG 212 is not authenticated with the UE 102 until the final message E(AUTH, CONFIG) provided by the ePDG 212 at the end of the authentication setup stage. As such, information provided by the UE 102 to the ePDG 212 before this stage can be provided to an unauthenticated peer. In some embodiments, the UE 102 provides geographic location information as part of an encrypted message, e.g., an E(AUTH, REQ) message, before authentication with the ePDG 212 is complete. The geographic location information can be included as part of an attribute (e.g., a configuration attribute) communicated by the UE 102 to the ePDG 212 in the E(AUTH, REQ) message. In some embodiments, the UE 102 provides geographic location information only after authentication is complete, e.g., as part of an E(INFO) message from the UE 102 to the ePDG 212. The geographic location information can be included as an attribute, e.g., a configuration attribute, in the informational message from the UE 102 to the ePDG 212. In response to geographic location information provided by the UE 102 (and/or based on other means for determining a geographic location of the UE 102), the ePDG 212 can respond with a notification message to allow or disallow connection to one or more APNs and/or to one or more services provided by one or more APNs. While attempting to establish the IPSec tunnel, the UE 102 can receive an acknowledgement message that includes the notification message, e.g., to disallow establishment of the IPSec tunnel to the APN requested by the UE 102 based on the provided and/or determined geographic location of the UE 102. In some embodiments, after establishment of the IPSec tunnel, and before being granted access to services, the UE 102 can provide geographic location information to the ePDG 212, e.g., in an E(INFO) message, and the ePDG 212 can respond with an E(INFO) message acknowledgement that allows or disallows access to the APN and/or one or more services provided by the APN. In some embodiments, no traffic can be allowed over the IPSec tunnel established between the ePDG 212 and the UE 102 until a geographic location exchange is completed.

In some embodiments, the UE 102 can provide geographic location information to the ePDG 212 after establishing a secure tunnel by using one or more IKEv2 INFORMATION message exchanges between the UE 102 and the ePDG 212. In some embodiments, an IKEv2 configuration attribute can be defined, e.g., a LOCATION configuration attribute, and included as part of a CFG SET Configuration payload in an INFORMATIONAL request message. The UE 102 can use the LOCATION configuration attribute to provide its geographic location information to the ePDG 212. Representative format and encoding for the LOCATION configuration attribute can be based formats defined in RFC 5580 Section 4, which defines various geographic location attributes. As referenced in RFC 5580, the additional RFC 6225 document can also used to determine formats for geographic location information, such as the Geospatial Location Profile described in RFC 6225, which supersedes RFC 6225. In some embodiments, geospatial location information can encoded as an opaque object and a format can be based on a Location Configuration Information (LCI) format as defined in Section 2 (or other appropriate sections) of RFC 3825, e.g., starting with a third octet and excluding codes for a Dynamic Host Configuration Protocol (DHCP) option and length field. While specific examples for configuration attribute formats and encoding are referred to above, alternative formats and/or encodings for location information can also be used, e.g., based on modifications to the formats described.

SIP Based Solutions

In some embodiments, an APN can provide multiple services, e.g., multiple IMS services such as VoIP (or Wi-Fi voice) and SMS can be supported through the same APN. Selective allowance and/or disallowance of individual services for a particular APN to the UE 102 based on its geographic location may be not possible at the ePDG 212. Thus, the ePDG 212 can allow the UE 102 to establish a secure tunnel (e.g., an IPSec tunnel) with the ePDG 212 for the specific APN and then during subsequent registration for services, a determination of whether to allow or disallow a set of services for the UE 102 operating at a determined geographic location can occur. In an embodiment, a SIP control node in an IMS network, e.g., an S-CSCF, can provide a central point for control of IMS services offered to the UE 102. The S-CSCF can require SIP registration for an IMS service to provide to the UE 102. The S-CSCF can determine whether to accept or reject IMS registration for the UE 102 for one or more services based on a determination of whether the services can be allowed or disallowed for the UE 102 when operating from the determined geographic location.

In a representative embodiment, the UE 102 can initiate a SIP registration for multiple services, e.g., Wi-Fi voice and SMS, by including a set of media feature tag values in a SIP REGISTER request. The media feature tag values included in the SIP REGISTER request can be included as parameters in a Contact Header field. For example, the SIP REGISTER request can include a media feature tag of +g.3gpp.icsi-ref=urn%3Aurn-7%3gpp-service.ims.imsi.mmetel, which together with an access type of WLAN and cell-id information present in the P-Access-Network-Info header field can identify that the UE 102 is requesting access to the Voice over Wi-Fi service while the UE 102 is at the particular location identified in the cell-id. In addition, the SIP REGISTER request can also include the media feature tag of +g.3gpp.smsip, which together with an access type of WLAN and cell-id information present in the P-Access-Network-Info header field can identify that the UE 102 requests access to the SMS service over Wi-Fi while the UE is at the particular location identified by the cell-id. The S-CSCF can determine whether different services as requested can be allowed or disallowed for the UE 102 based on the geographic location of the UE 102. When none of the requested services are allowed, the S-CSCF can deny the registration. When at least one of the requested services is allowed, the S-CSCF can accept the registration of the UE 102. When at least one of the requested services is not allowed, the S-CSCF, after accepting the registration of the UE 102, can immediately start a network-initiated deregistration procedure. For example, the S-CSCF can remove any media feature tags for disallowed services from the registration status record for the UE 102. As a representative example, if Wi-Fi voice is not allowed but SMS is allowed, the S-CSCF can accept the registration of the UE 102 and then remove the string +g.3gpp.icsi-REF=urn%3Aurn-7%3gpp-service.ims.imsi.mmte media feature tag from the registration status record of the UE 102.

Figure 5:
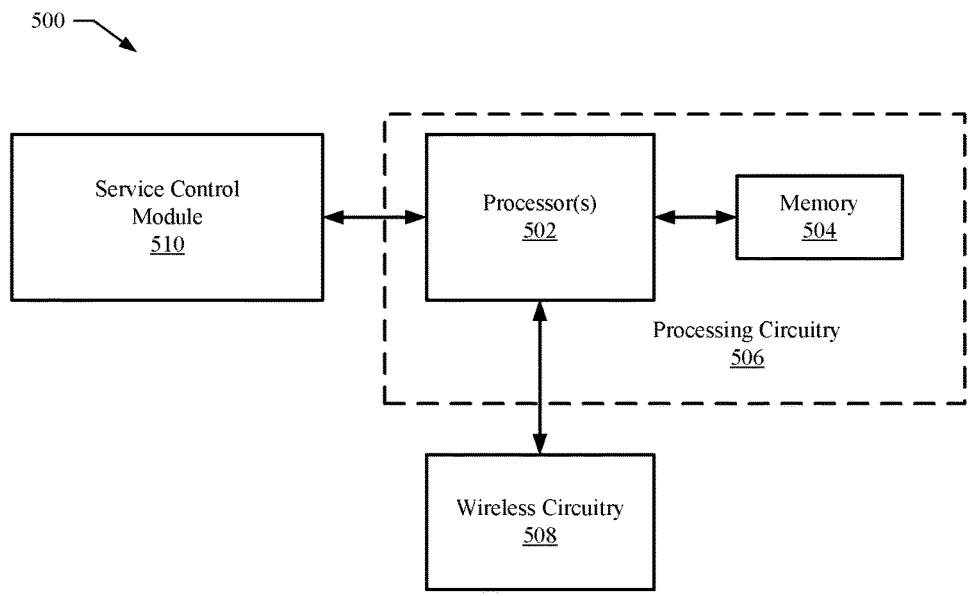
FIG. 5 illustrates a block diagram of an exemplary apparatus that can be implemented on a wireless communication device to support control of access to services, in accordance with some embodiments.

FIG. 5 illustrates a diagram 500 of exemplary components of a wireless communication device, such as UE 102, including one or more processor(s) 502 coupled to memory 504, which together can be referred to as processing circuitry 506, wireless circuitry 508 that provides for wireless radio frequency (RF) connections between the UE 102 and various wireless networks, e.g., the 3GPP cellular wireless access 206 using the cellular wireless circuitry 104A and/or the non-3GPP IP wireless access 208 using the non-cellular wireless circuitry 104B. The UE 102 can also include a service control module 510 configurable to operate together with the processing circuitry 506 and the wireless circuitry 508 to perform one or more operations for the UE 102 as described herein to realize service access control to a set of services based on a geographic location of the UE 102. In some embodiments, the wireless circuitry 508 includes one or more baseband processor(s), and a set of RF analog front-end circuitry. In some embodiments, the wireless circuitry 508 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 508 can include components of RF analog front-end circuitry, e.g. a set of one or more antennas, which can be interconnected with additional supporting RF circuitry that can include filters and other analog components that can be configured for transmission and/or reception of analog signals via one or more corresponding antennas to one or more wireless networks.

The processor(s) 502 and the wireless circuitry 508 can be configured to perform and/or control performance of one or more functionalities of the UE 102, in accordance with various implementations. The processor(s) 502 and the wireless circuitry 508 can provide functionality for control service access to one or more access point names (APNs) and/or services provided through one or more APNs for the UE 102. The processor(s) 502 may include multiple processors of different types that can provide for both wireless communication management and/or higher layer functions, e.g., one or more of the processor(s) 502 may be configured to perform data processing, application execution, and/or other device functions according to one or more embodiments of the disclosure. The UE 102, or portions or components thereof, such as processor(s) 502, can include one or more chipsets, which can respectively include any number of coupled microchips thereon.

In some embodiments, the processor(s) 502 may be configured in a variety of different forms. For example, the processor(s) 502 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 502 of the UE 102 can be coupled to and/or configured in operative communication with each other, and these components may be collectively configured to perform IP flow mobility management functions via multiple wireless networks. In some implementations, the processor(s) 502 can be configured to execute instructions that may be stored in memory 504, or that can otherwise be accessible to the processor(s) 502 in some other device memory. As such, whether configured as, or in conjunction with, hardware or a combination of hardware and software, the processor(s) 502 may be capable of performing operations according to various implementations described herein, when configured accordingly. In various embodiments, memory 504 in the UE 102 may include multiple memory devices that can be associated with any common volatile or non-volatile memory type. In some scenarios, the memory 504 may be associated with a non-transitory computer-readable storage medium that can store various computer program instructions, which may be executed by the processor(s) 502 during normal program executions. In this regard, the memory 504 can be configured to store information, data, applications, instructions, or the like, for enabling the UE 102 to carry out various functions in accordance with one or more embodiments of the disclosure. In some implementations, the memory 504 may be in communication with, and/or otherwise coupled to, the processor(s) 502, as well as one or more system buses for passing information between and amongst the different device components of the UE 102.

It should be appreciated that not all of the components, device elements, and hardware illustrated in and described with respect to the UE 102 shown in FIG. 5 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 5.

Figure 6:
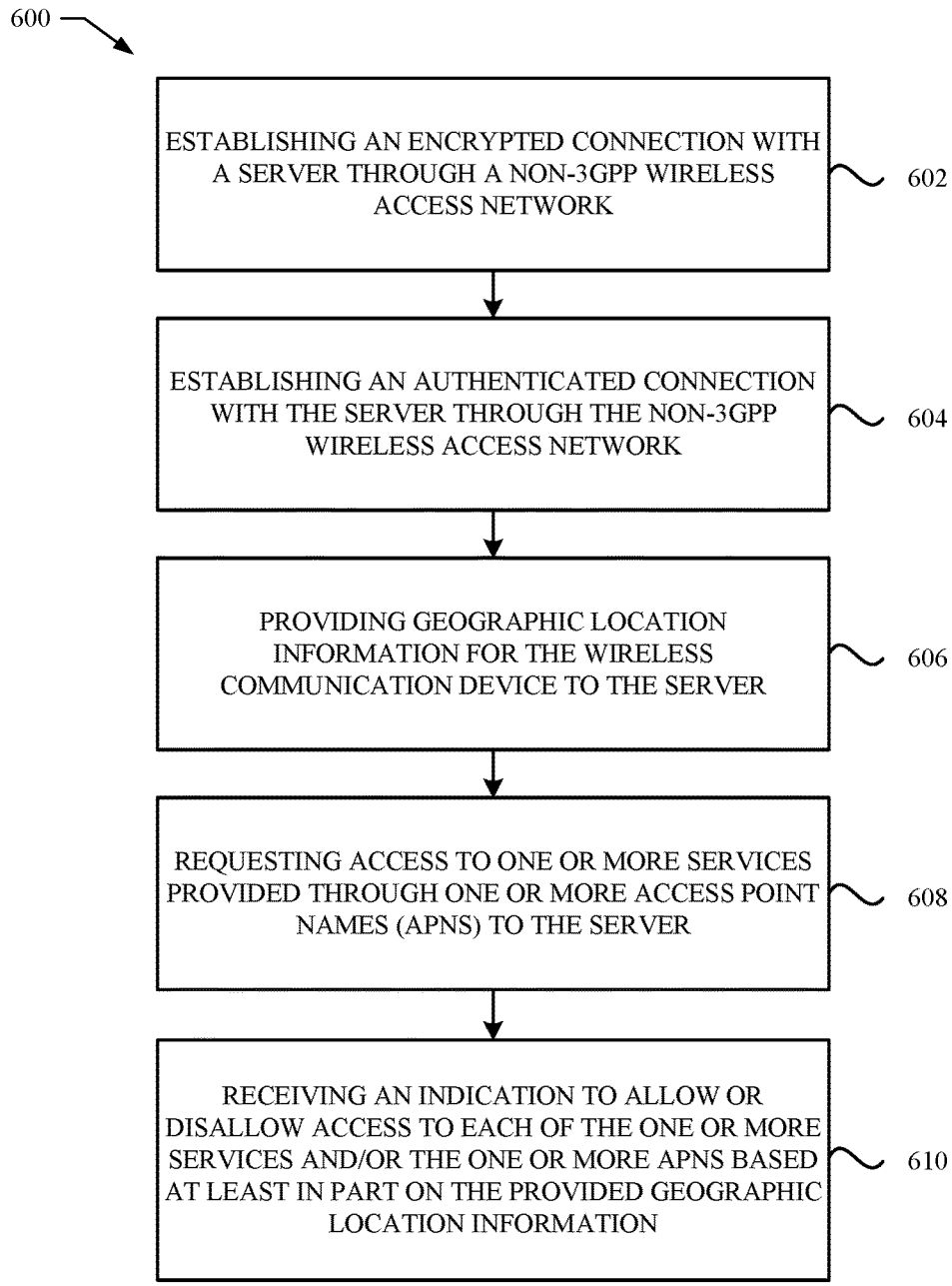
FIG. 6 illustrates an example method to control access to services for a wireless communication device, in accordance with some embodiments.

FIG. 6 illustrates an example method 600 to control service access for a wireless communication device implemented at the wireless device, at least in part. In step 602, the wireless communication device establishes an encrypted connection with a server through a non-3GPP wireless access network. In step 604, the wireless communication device establishes an authenticated connection with the server through the non-3GPP wireless access network. In step 606, the wireless communication device provides geographic location information for the wireless communication device to the server. In step 608, the wireless communication device requests access to one or more services provided through one or more access point names (APNs) to the server. In step 610, the wireless communication device receives an indication to allow or disallow access to each of the one or more services and/or the one or more APNs based at least in part on the geographic location information of the wireless communication device.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to control service access for a wireless communication device, the method comprising:
by the wireless communication device:
establishing an encrypted connection with a server through a non-3GPP wireless access network;
establishing an authenticated connection with the server through the non-3GPP wireless access network;
providing geographic location information for the wireless communication device to the server as an attribute in an Internet Key Exchange Version 2 (IKEv2) protocol message;
requesting access to one or more services provided through one or more access point names (APNs) to the server; and
receiving an indication to allow or disallow access to at least one of the one or more services and/or to the one or more APNs based at least in part on the provided geographic location information.

2. The method as recited in claim 1, wherein the IKEv2 protocol message comprises a configuration request message sent during an authentication phase before authentication of the server by the wireless communication device is complete.

3. The method as recited in claim 1, wherein the IKEv2 protocol message comprises an informational notification message sent after authentication of the server by the wireless communication device is complete.

4. The method as recited in claim 1, wherein the server comprises an evolved packet data gateway (ePDG) associated with a wireless service provider.

5. The method as recited in claim 4, wherein the indication to allow or disallow access comprises a notification message from the ePDG that disallows establishment of at least one Internet Protocol Security (IPSec) tunnel to at least one of the one or more APNs.

6. The method as recited in claim 1, wherein the indication to allow or disallow access comprises a notification that disallows access to at least one service via the non-3GPP wireless access network based on the geographic location information provided by the wireless communication device.

7. The method as recited in claim 6, wherein the indication to allow or disallow access further comprises an indication of an alternative connection through which the wireless communication device can access the at least one service.

8. The method as recited in claim 7, wherein the alternative connection comprises a connection via a cellular wireless access network of a wireless service provider.

9. The method as recited in claim 1, wherein the geographic location information comprises a mobile country code (MCC) and/or a mobile network code (MNC).

10. The method as recited in claim 1, wherein the geographic location information comprises longitude and latitude information derived from a global positioning system (GPS) receiver of the wireless communication device.

11. The method as recited in claim 1, wherein the geographic location information comprises wireless local area network (WLAN) access point (AP) location data.

12. A wireless communication device comprising one or more processors and a memory storing instructions that, when executed on the one or more processors, cause the wireless device to
establish an encrypted connection with a server through a non-3GPP wireless access network;
establish an authenticated connection with the server through the non-3GPP wireless access network;
provide geographic location information for the wireless communication device to the server as a configuration attribute in an Internet Key Exchange Version 2 (IKEv2) protocol message;
request access to one or more services provided through one or more access point names (APNs) to the server; and
receive an indication to allow or disallow access to at least one of the one or more services and/or to the one or more APNs based at least in part on the provided geographic location information.

13. The wireless communication device of claim 12, wherein the indication to allow or disallow access to at least one of the one or more services and/or to the one or more APNs comprises a notification to disallow access to a first service and to allow access to a second service.

14. The wireless communication device of claim 12, wherein the IKEv2 protocol message comprises a configuration request message sent during an authentication phase of the IKEv2 protocol before authentication of the server by the wireless communication device is complete.

15. The wireless communication device of claim 12, wherein the IKEv2 protocol message comprises an informational notification message sent after authentication of the server by the wireless communication device is complete.

16. The wireless communication device of claim 12, wherein the indication to allow or disallow access comprises a notification that disallows access to at least one service via the non-3GPP wireless access network based on the geographic location information provided by the wireless communication device.

17. The wireless communication device of claim 16, wherein the indication to allow or disallow access further comprises an indication of an alternative connection through which the wireless communication device can access the at least one service.

18. A non-transitory computer-readable medium storing instructions that, when executed by one or more processors of a wireless communication device, cause the wireless communication device to:

establish an encrypted connection with a server through a non-3GPP wireless access network;

establish an authenticated connection with the server through the non-3GPP wireless access network;

provide geographic location information for the wireless communication device to the server as an attribute in an Internet Key Exchange Version 2 (IKEv2) protocol message;

request access to one or more services provided through one or more access point names (APNs) to the server; and receive an indication to allow or disallow access to at least one of the one or more services and/or to the one or more APNs based at least in part on the provided geographic location information.

19. The non-transitory computer-readable medium of claim 18, wherein the IKEv2 protocol message comprises a configuration request message sent during an authentication phase before authentication of the server by the wireless communication device is complete.

20. The non-transitory computer-readable medium of claim 18, wherein the geographic location information comprises longitude and latitude information derived from a global positioning system (GPS) receiver of the wireless communication device.

* * * * *